United States Patent
Heubach et al.

(12)

(10) Patent No.: US 6,494,503 B1
(45) Date of Patent: Dec. 17, 2002

(54) PIPE JOINT ASSEMBLY AND METHOD FOR USING SAME

(75) Inventors: Glenn C. Heubach, Mobile, AL (US); Jay D. Tripp, Biloxi, MS (US)

(73) Assignee: Non Metallic Resources, Inc., Mobile, AL (US)

( * ) Notice: Subject to any disclaimer, the term of this patent is extended or adjusted under 35 U.S.C. 154(b) by 0 days.

(21) Appl. No.: 09/536,162

(22) Filed: Mar. 25, 2000

(51) Int. Cl.[7] .................................................. F16L 23/00
(52) U.S. Cl. ....................... 285/405; 285/414; 285/415; 285/363; 285/222.1
(58) Field of Search ................................ 285/414, 415, 285/412, 363, 368, 405, 222.1–222.5

(56) References Cited

U.S. PATENT DOCUMENTS

| | | | | |
|---|---|---|---|---|
| 1,186,621 A | * | 6/1916 | Townsend | 285/414 X |
| 2,298,736 A | * | 10/1942 | Harpfer | 285/222.2 |
| 2,298,738 A | * | 10/1942 | Kimmich et al. | 285/222.5 |
| 2,408,960 A | * | 10/1946 | Stivason | 285/412 |
| 2,880,020 A | * | 3/1959 | Audette | 285/414 X |
| 3,214,203 A | * | 10/1965 | Mongodin | 285/414 |
| 3,604,733 A | * | 9/1971 | Hubbell, III | 285/334.5 |
| 4,104,095 A | | 8/1978 | Shaw | |
| 4,282,905 A | | 8/1981 | Dopkin et al. | |
| 4,347,090 A | | 8/1982 | Anderson et al. | |
| 4,357,962 A | | 11/1982 | Shaw et al. | |
| 4,643,457 A | * | 2/1987 | Press | 285/55 |
| 5,314,215 A | * | 5/1994 | Weinhold | 285/283 |
| 6,315,335 B1 | * | 11/2001 | Seedorff | 285/415 |
| 6,331,020 B1 | * | 12/2001 | Brunella | 285/179 |
| 6,361,080 B1 | * | 3/2002 | Walsh et al. | 285/222.1 |

FOREIGN PATENT DOCUMENTS

NO          55477    *  7/1935    .................. 285/414

OTHER PUBLICATIONS

Resistoflex Corporation, "Specification Standards for Lined Pipe and Fittings," RES–77, Revision 6, Roseland, New Jersey: Resistoflex Corporation, pp. 1–4 (Sep., 1973).
Resistoflex Corporation, "Lined Pipe and Fittings," LP–4, Roseland, New Jersey: Resistoflex Corporation, pp. 1–20 (1973).

(List continued on next page.)

Primary Examiner—Lynne H. Browne
Assistant Examiner—Aaron M Dunwoody
(74) Attorney, Agent, or Firm—Braman & Rogalskyj, LLP

(57) ABSTRACT

The present invention relates to a method for sealing an end of a pipe, to an external sealing surface. The method includes providing a pipe assembly which includes a pipe and a flange. The pipe includes a proximal pipe end and a flared end region. The flared end region is integral with the pipe and is proximate to and continuous with the proximal pipe end. The flange is non-integrally disposed around the pipe distal to the pipe's flared end region. The method further includes securing, non-integrally and distally to the pipe's flared end region, the flange to the pipe so that proximal movement of the flange relative to the pipe is restricted. The flange is drawn toward the external sealing surface, which causes the flange sealing surface to bias the pipe's flared end region into sealing contact with the external sealing surface. Pipe assemblies which include a backup ring having a tapered inside surfaces and a flange having tapered outside surfaces are also discussed. The methods and assemblies disclosed herein are particularly useful for joining lengths of multi-laminate, especially dual-laminate, pipe.

42 Claims, 7 Drawing Sheets

OTHER PUBLICATIONS

Resistoflex Corporation, "Fluoroflex(R)–K Solid Kynar(R)) Piping Systems," SK–4, Roseland, New Jersey: Resistoflex Corporation, pp. 1–4 (1971).

Resistoflex Corporation, "Instructions for: Field Flaring of Resistoflex Lined Pipe," FF–3, Roseland, New Jersey: Resistoflex Corporation, pp. 1–4 (1971).

Resistoflex Corporation, "Supplemental Instructions for: Field Flaring of Resistoflex Lined Pipe Using Standard 150–lb Slip–on Flanges," FF–3 SUP., Roseland, New Jersey: Resistoflex Corporation, pp. 1 (date unknown).

Resistoflex Corporation, "Bellows Expansion Loints and Flexible Couplings," B–8, Roseland, New Jersey: Resistoflex Corporation, pp. 1–8 (1974).

Resistoflex Corporation, "Reaction Vessel Components," DS–4A, Roseland, New Jersey: Resistoflex Corporation, pp. 1–8 (1969).

Resistoflex Corporation, "Hoses & Fittings," H–5A, Roseland, New Jersey: Resistoflex Corporation, pp. 1–8 (1973).

Resistoflex Corporation, "Chemical Transfer Hose," CT–5, Roseland, New Jersey: Resistoflex Corporation, pp. 1–8 (1972).

Non–Metallic Resources, Inc., "Product and Material Specifications," Mobile Alabama: Non–Metallic Resources, Inc. (1994–2000) (83 pages).

* cited by examiner

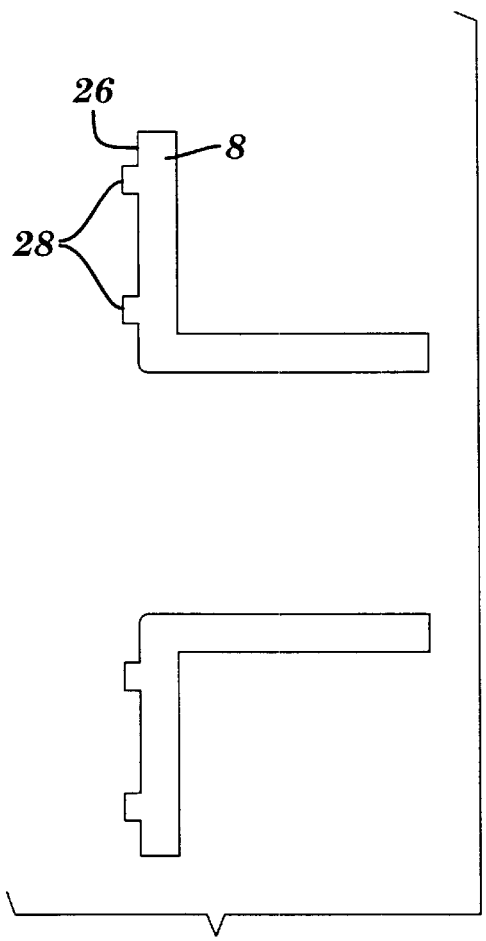
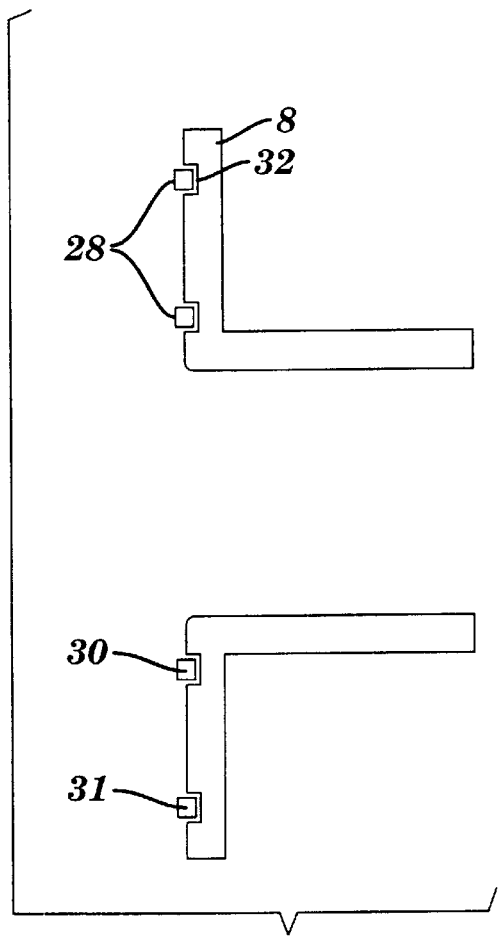
*FIG. 3A*          *FIG. 3B*

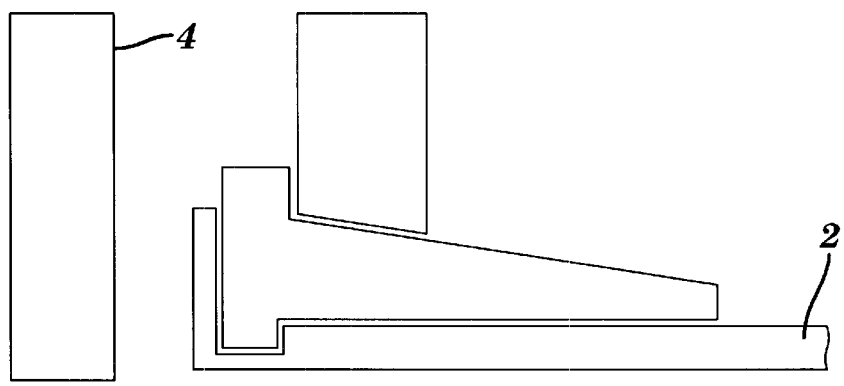
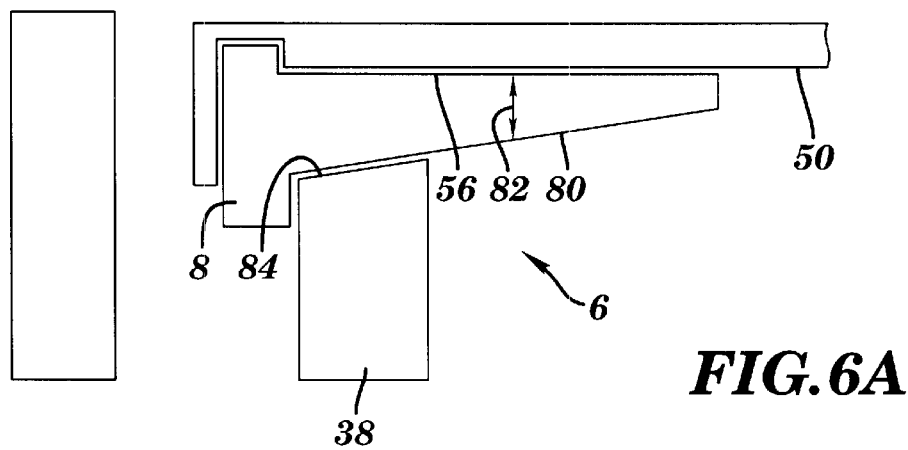
FIG.6A
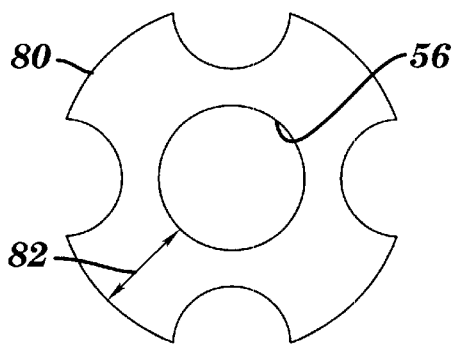
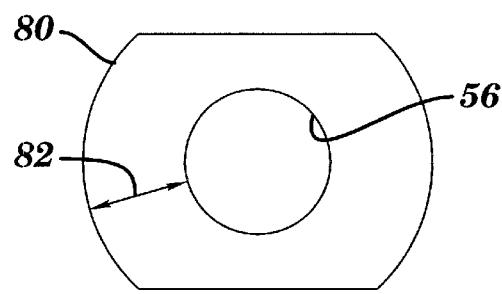
FIG.6B      FIG.6C

6,494,503 B1

PIPE JOINT ASSEMBLY AND METHOD FOR USING SAME

FIELD OF THE INVENTION

The subject invention relates, generally, to pipe joint assemblies and to methods for making pipe joints and, more particularly, to a methods for joining multi-laminate pipes.

BACKGROUND OF THE INVENTION

In many industries, large volumes of corrosive and/or hazardous chemicals are used on a daily basis. Transfer of these chemicals across industrial plant sites occurs through a variety of pipe systems designed to withstand the corrosive nature of the chemicals and prevent the release of hazardous liquids, gases, vapors, and other emissions. This is often accomplished by using steel pipe fitted with a thermoplastic liner. The steel pipe acts as a structural casing and provides protection for the thermoplastic liner. The thermoplastic liner is the containment material, preventing exposure of the steel pipe structure and the environment to the corrosive and/or hazardous chemicals.

Similarly, dual laminate pipe has also been used to transport corrosive and/or hazardous chemicals. Like lined steel pipe, dual laminate pipe consists of a structural casing that supports and protects a thermoplastic liner. However, the emergence and success of dual laminate pipe, which is, typically, the more expensive alternative, suggests that the dual laminate pipe has advantages over lined steel pipe. Among these advantages are a light weight; for example, the fiberglass-reinforced plastic ("FRP") casing used as the outer laminate in many dual laminate pipes is four times lighter than steel. Furthermore, the outer laminate in the dual laminate pipe, typically, is more resistant to corrosion and other environmental effects than is steel and, unlike steel, requires no additional corrosion protection (e.g. painting). Another advantage of dual laminate pipe relates to the fact that the inner laminate (e.g., the thermoplastic liner) is fully bonded to the outer laminate (e.g., an FRP structure), which permits the dual laminate pipe to withstand exposure to vacuum even at elevated temperatures). Furthermore, use of dual-laminate pipe enables one to reduce the number of flanged joints required in the system, thus reducing the likelihood of emissions from flanged joints.

Despite these advantages of dual-laminate pipe, three distinctions sometimes make lined steel pipe an attractive alternative.

The first advantage relates to initial cost. The cost, in terms of materials and manpower, of producing dual laminate pipe is higher than that of lined steel pipe. However, since dual laminate pipe lasts from three to five times as long as lined steel pipe in the same applications, lifecycle costs can frequently justify the higher initial expenditure.

The second advantage relates to strength. The steel casing of lined steel pipe is capable of spanning greater lengths between supports. This reduces the number of structural locations and pipe supports required to properly install the lined steel pipe system. However, in most applications, the additional costs for extra support steel and other support devices needed to install dual-laminate pipe vis a vis lined steel pipe are actually minimal. Moreover, using a number of techniques developed to adapt dual laminate systems to existing pipe support structures designed for lined steel pipe systems, these additional costs turn out to be a very small percentage of the job's total cost.

The third advantage relates to the ease of installation of lined steel vis a vis dual laminate pipe systems. Customers using a lined steel system are capable of making pipe sections themselves. They can prepare a steel pipe section by welding flanges on each end and then inserting a thermoplastic liner and flaring the liner material over the ends of the flanges. Currently, customers using dual laminate pipe systems must rely on the manufacturer to supply custom-made pipe sections. They must also rely on emergency service from the manufacturer should damage or failure occur. Until now there has been no method developed that allowed customers to prepare random length pipe sections for dual laminate pipe.

Accordingly, there exists a need for a method of joining sections of dual-laminate pipe. The present invention is directed to meeting this need.

SUMMARY OF THE INVENTION

The present invention relates to a method for sealing an end of a pipe to an external sealing surface. The method includes providing a pipe assembly which includes a pipe (such as a multi-laminate pipe) and a flange. The pipe includes a proximal pipe end and a flared end region. The flared end region is proximate to and continuous with the proximal pipe end. The flange is non-integrally disposed around the pipe distal to the pipe's flared end region. The method further includes securing, non-integrally, distally, and loosely to the pipe's flared end region, the flange to the pipe so that proximal movement of the flange relative to the pipe is restricted. The flange is drawn toward the external sealing surface, which causes the flange sealing surface to bias the pipe's flared end region into sealing contact with the external sealing surface.

The present invention also relates to another method for sealing an end of a pipe to an external sealing surface. In this method a pipe assembly which includes a pipe and a flange is provided. The pipe is a multi-laminate pipe and includes a proximal pipe end and a flared end region. The flared end region is proximate to and continuous with the proximal pipe end. The flange is non-integrally disposed around the pipe distal to the pipe's flared end region, and the flange is secured, non-integrally and distally to the pipe's flared end region, to the pipe so that proximal movement of the flange relative to the pipe is restricted. The method further includes drawing the flange toward the external sealing surface, which causes the flange sealing surface to bias the pipe's flared end region into sealing contact with the external sealing surface.

The present invention also relates to a pipe assembly which includes a pipe and a flange. The pipe includes a proximal pipe end and a flared end region. The flared end region is proximate to and continuous with the proximal pipe end, and the flange is non-integrally secured to the pipe distal to the pipe's flared end region.

The present invention also relates to a joint assembly. The joint assembly includes a flange having an outer surface, an inner surface, and a proximal flange sealing surface end. The proximal flange sealing surface end has an annular recess therein, the inner surface includes a circumferential groove or a circumferential ridge, and the flange's surface comprises a taper. The joint assembly further includes a backer ring having a tapered inside flange mating surface. The backer ring is disposed around the flange's outer surface and urged proximally relative to the flange, the backer ring biases the inner surface of the flange inwardly.

The present invention relates to yet another method for sealing an end of a pipe to an external sealing surface. The method includes providing a pipe assembly which includes a pipe, a flange, and a backer ring. The pipe includes a proximal pipe end, an outer surface, and a flared end region. The flared end region is proximate to and continuous with the proximal pipe end. The flange includes an inner surface, and the flange is non-integrally disposed around the pipe distal to the pipe's flared end region. The method further includes securing, non-integrally and distally to the pipe's flared end region, the flange to the pipe so that proximal movement of the flange relative to the pipe is restricted. The method also includes drawing the flange toward the external sealing surface by urging the backer ring toward the external sealing surface. The drawing process causes the flange sealing surface to bias the pipe's flared end region into sealing contact with the external sealing surface, and the urging process biases the inner surface of the flange against the outer surface of the pipe.

The present invention also relates to still another method for sealing an end of a pipe to an external sealing surface. The method includes providing a pipe assembly that includes a pipe, a flange, and a backer ring. The pipe includes a proximal pipe end, an outer surface, and a flared end region. The flared end region is proximate to and continuous with the proximal pipe end. The flange includes an inner surface and is non-integrally disposed around the pipe distal to the pipe's flared end region. The flange is also secured, non-integrally and distally to the pipe's flared end region, to the pipe so that proximal movement of the flange relative to the pipe is restricted. The method also includes drawing the flange toward the external sealing surface by urging the backer ring toward the external sealing surface. The drawing process causes the flange sealing surface to bias the pipe's flared end region into sealing contact with the external sealing surface, and the urging process biases the inner surface of the flange against the outer surface of the pipe.

The present invention further relates to another pipe assembly. The pipe assembly includes a pipe which has a proximal pipe end, an outer surface, and a flared end region. The flared end region is proximate to and continuous with the proximal pipe end. The pipe assembly further includes a flange. The flange has an inner surface and is non-integrally disposed around the pipe distal to the pipe's flared end region. The pipe assembly also includes a backer ring, which, when urged proximally relative to the pipe, biases the inner surface of the flange against the outer surface of the pipe.

BRIEF DESCRIPTION OF THE DRAWINGS

FIGS. 3A and 3B are axial cross-sectional views of a two flanges in accordance with the present invention.

FIG. 6A is an axial cross-sectional view of a pipe assembly in accordance with the present invention.

FIGS. 6B and 6C are radial cross-sectional views of two flanges in accordance with the present invention.

DETAILED DESCRIPTION OF THE INVENTION

Figure 1:
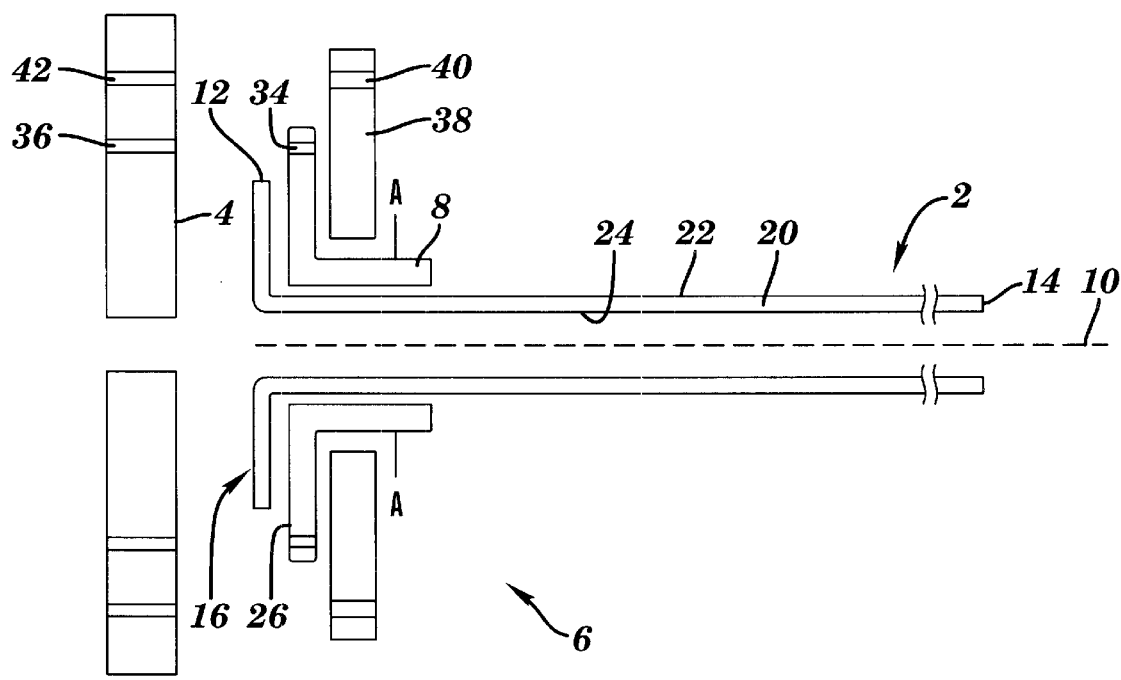
FIG. 1 is an axial cross-sectional view of a pipe assembly in accordance with the present invention.

The present invention relates to methods for sealing an end of a pipe to an external sealing surface and to pipe assemblies and joint assemblies. "Pipe", as used herein is meant to include any enclosed conduit used for transporting, containing, or excluding gas, vapor, or liquid. Illustrative examples of "pipes", as used herein, include metal pipes, (e.g., wrought iron pipes, steel pipes (e.g., "black iron" pipes and galvanized steel pipes), lead pipes, copper pipes, brass pipes, etc), ceramic pipes (e.g., terra cotta pipes), glass pipes, and plastic pipes. Plastic pipes include, for example, pipes made from vinyl polymers (e.g., PVC pipes and CPVC pipes), pipes made form olefinic polymers (e.g., polyethylene and polypropylene), and pipes made from fluoropolymers (e.g., KYNAR™, polyvinylidine fluoride ("PVDF"), and polytetrafluoro-ethylene-co-hexafluoropropylene ("FEP"). Plastic pipes also include pipes made from thermoset plastics, such as fiberglass reinforced plastic ("FRP") pipes, which are also sometimes referred to as reinforced thermosetting resin pipe ("RTRP") and glass reinforced pipe ("GRP"). "Pipes", as used herein, are meant to include rigid pipes, as well as those pipes which are flexible, which are sometimes referred to in the art as "tubing" (e.g., copper tubing; polymer tubing, such as TYGON™ tubing; etc.).

The pipes can be unlined or lined, single-laminate or multi-laminate. As used herein, a "lined pipe" is one which includes a liner which is substantially not bonded (e.g., less than about 50% bonded) to the outer, structural portion of the pipe. As used herein, a "multi-laminate pipe" is a pipe which is made of two or more layers that are substantially bonded (e.g., more than 50% bonded) to each other along the entire length of the pipe. By definition, a multi-laminate pipe includes an innermost laminate and an outermost laminate. The multi-laminate pipe may also include one or more intermediate laminates, such as one intermediate laminate (in the case of a 3-laminate pipe), two intermediate laminates (in the case of a 4-laminate pipe), three intermediates laminate (in the case of a 5-laminate pipe), etc.

"Sealing", as used herein, is meant to be construed broadly and is meant to include any form or degree of attachment which substantially prevents liquid or gas contained within the pipe (or excluded from the pipe) from leaking or from substantially leaking at the seal under the pressures of normal operation, such as under ambient atmospheric pressure (e.g., in the case of gravity drain systems), under positive pressures of up to about 500 psi or more above atmospheric pressure (e.g., in the case of high pressure liquid and/or gas delivery systems), or under negative pressures of from about 760 Torr to about 0.1 mTorr or less below atmospheric pressure (e.g., in the case of vacuum systems).

"External sealing surface", as used herein, is meant to include any surface to which it may be desirable to seal the pipe. The word "external" in "external sealing surface" is used only to distinguish the external sealing surface from the flange sealing surface (discussed further below). The external sealing surface can be part of a device housing (e.g., a pump housing, a backflow preventer housing, a valve housing), part of a coupling (e.g., a tee-coupling, a wye-coupling, etc), or part of a flange which is connected to another pipe. The external sealing surface can have any suitable shape. For example, it can be substantially planar, or it can be convex or concave so as to permit some degree of misalignment (as is typically found in conventional plumbing unions), or it can be substantially planar (as in the case of a planar flange). Although all of the examples of external sealing surfaces discussed above relate to surfaces which permit the passage of gas, liquid, etc., the external sealing surface can be part of a device or coupling which does not permit such passage, such as a plate (e.g., to terminate a run of pipe) or a sensing surface of a pressure sensing gauge.

The external sealing surface is preferably substantially perpendicular to the pipe. For example, in the case of substantially planar external sealing surfaces, as used herein, "substantially perpendicular to the pipe" is meant to include situations where the pipe's central axis forms a 90° angle with the plane defined by the external sealing surface as well as situations in which the pipe's central axis forms an angle of between about 65° and about 90° with the plane defined by the external sealing surface. In some situations, the external sealing surface will be an integral part of the above-mentioned device housing, coupling, or flange. In other situations, the external sealing surface will be the surface of a gasket that is backed by the above-mentioned device housing, coupling, or flange.

Referring now to FIG. 1, the present invention relates to a method for sealing an end of a pipe 2 to an external sealing surface 4. The method of the present invention includes providing pipe assembly 6 which includes pipe 2 and a flange 8.

Pipe 2 can be any of the types of pipe referred to above. Pipe 2 has a pipe axis 10 and two ends: a proximal pipe end 12, which, as used herein, refers to the end which is to be sealed to the external sealing surface, and distal end 14. Relative direction along pipe axis 10 is sometimes referred to herein with reference to pipe 2's proximal pipe end 12 and distal pipe end 14. For example, as used herein, "proximal" and "proximally" refer to a direction toward pipe 2's proximal pipe end 12, and "distal" and "distally" refer to a direction away from pipe 2's proximal pipe end 12. As further illustrations, "A proximal to B" means that A is closer to pipe 2's proximal pipe end 12 than is B; "A distal to B" means that B is closer to pipe 2's proximal pipe end 12 than is A; "proximal movement" means movement toward pipe 2's proximal pipe end 12; and "distal movement" means movement away from pipe 2's proximal pipe end 12. As indicated above, pipe 2 has pipe axis 10, which is an imaginary line passing through the geometric center of the pipe along its length. In the case where pipe 2 has a circular cross section, the geometric center of pipe 2 is the center of the cross sectional circle. Where pipe 2 has a non-circular cross section, the geometric center of pipe 2 is herein defined as the center of rotation of pipe 2's cross section.

Pipe 2 also includes flared end region 16. Flared end region 16 can, optionally, be integral with pipe 2. For purposes of the present application, A is "integral with" B whenever A and B are formed (e.g., cast, molded, extruded, spun, etc.) as a single unit. Characteristically, when A is "integral with" B, there are no voids between A and B (as in the case where A is mechanically attached to B), there is no discontinuity in material between A and B (as in the case where A is glued to B with an adhesive), and there is no discontinuity in microstructure between A and B (as in the case where A is welded (e.g., heat welded or solvent welded) to B). Conversely, for purposes of the present application, A is "non-integral with" B whenever A and B are not formed as a single unit. Characteristically, when A is "non-integral with" B, there are voids between A and B (as in the case where A is mechanically attached to B), there are discontinuities in material between A and B (as in the case where A is glued to B with an adhesive), and/or there are discontinuities in microstructure between A and B (as in the case where A is welded (e.g., heat welded or solvent welded) to B).

Flared end region 16 is also continuous with pipe 2's proximate pipe end 12. For purposes of the present application, flared end region 16 is the entire flared portion of pipe 2 starting from proximate pipe end 12 and ending where pipe 2 regains a substantially uniform inside cross section or, in the case of a pipe having circular cross section, where the inside diameter becomes constant. The shape of the flare in flared end region 16 is not critical to the practice of the present invention, and it can be planar, convex, concave (all as viewed in a plane which contains pipe axis 10), or any other suitable shape. Preferably, the flare is substantially planar and perpendicular to pipe axis 10, and, more preferably, the transition from pipe 2's non-flared portion to the planar portion of flared end region 16 is sharp rather than gradual.

Flared end region 16 can be formed using any conventional flaring method. The particular method used, of course, will depend on the nature of the material being flared, the thickness of the pipe wall, the diameter of the pipe, the shape of the desired flare, and the like. With some materials (e.g. glass), it may be advantageous to soften the pipe, for example, by heating or by using solvents, in the region of the flare prior to or during the flaring operation. With some materials, it may be desirable to make pipe wall 20 thinner, by for example removing material from outer pipe surface 22 or inner pipe surface 24 in flared end region 16 prior to or during the flaring operation.

Figure 4A:
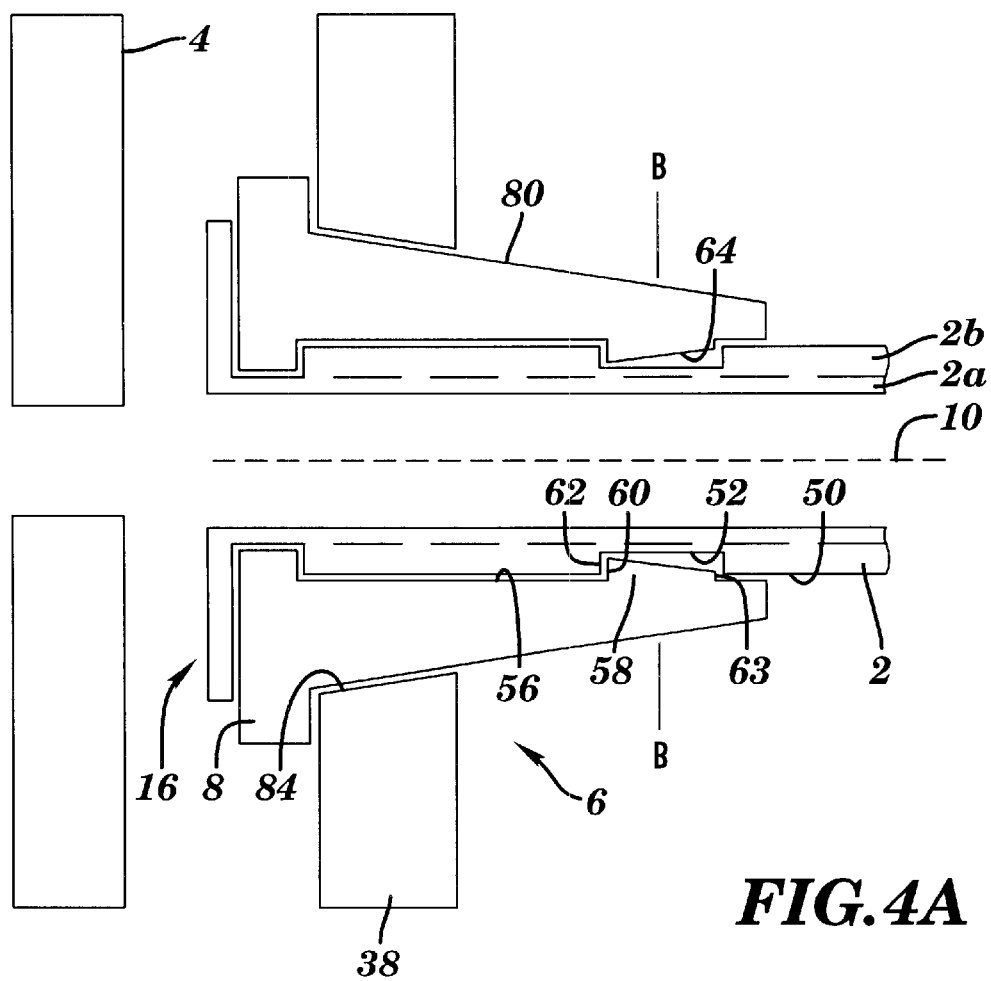
FIG. 4A is an axial cross-sectional view of a pipe assembly in accordance with the present invention.

As indicated above, the present invention is particularly well suited where pipe 2 is a multi-laminate pipe. When practicing the method of the present invention using multi-laminate pipe, it is particularly preferred that flared end region 16 be thinner than the remainder of pipe 2. This is illustrated in FIG. 4A. As discussed above and as illustrated in FIG. 4A, multilaminate pipe 2 can include innermost laminate 2a and outermost laminate 2b. Typically, with multi-laminate pipe, the innermost laminate is the most inert and it is usually preferable that the exposed proximal face of flared end region 16 be made of this innermost laminate. Accordingly, multi-laminate pipe is typically thinned from the outside. Preferably, flared end region 16 includes the entire thickness of the innermost laminate and none of the other laminates. However, the flared end region 16 can be thinned so as to include only a portion of the innermost laminate's thickness. In the case of multi-laminate pipes containing intermediate laminate layers (e.g., 3-laminate pipes, 4-laminate pipes, etc.), flared end region 16 can also include one or more (or portions thereof) of the intermediate laminate layers. Flared end region 16 can also include a portion of the outermost laminate, e.g., less than about 50%, more preferably less than about 20%, still more preferably, less than about 5%, and still more preferably, less than about 2%, of the outermost laminate's thickness. However, typically, flared end region 16 will include none or substantially none of the outermost laminate.

The length of flared end region 16 is not particularly critical to the practice of the present invention. Preferably, when using multi-laminate pipe, a sufficiently long region is thinned so that it can be readily flared. Typically, lengths of the thinned flared end region 16 are no more than about 3 times the diameter of the smallest circle which circumscribes the cross section of pipe 2. In the case where pipe 2 has a circular cross-section of diameter d, the length of the thinned region is preferably no more than about 3d.

Although not critical for the practice of the present invention, it is preferred that the wall-thickness of the pipe in the thinned region be substantially uniform, at least with respect to the pipe's circumference and, more preferably, also with repect to the length of the thinned region.

Multi-laminate pipe suitable for use in the method of the present invention can be made, for example, by any conventional method for making multi-laminate pipes, such as those disclosed in U.S. Pat. No. 4,357,962 to Shaw et al., U.S. Pat. No. 4,347,090 to Anderson et al., U.S. Pat. No. 4,282,905 to Dopkin et al., and U.S. Pat. No. 4,104,095 to Shaw, which are hereby incorporated by reference.

The thinned flared end region 16 of the multilaminate pipe can be the result of the process used to make the multi-laminate pipe. For example, in a dual-laminate pipe, when the outermost laminate is applied to and bonded with the innermost laminate, the length of the outermost laminate can be selected such that it is shorter than the length of the innermost laminate so that the resulting product has a thinned region proximate to one or both of the pipe ends. In this case, the flared end region 16 includes the entire thickness of the innermost laminate and none of the outermost laminate Alternatively, the flared end region 16 of the multi-laminate pipe can be thinned subsequent to the pipe's manufacture, for example, by removing, from flared end region 16, a portion of the outermost laminate, all of the outermost laminate, all of the outermost laminate and a portion of the intermediate laminates, all of the outermost laminate and all of the intermediate laminates, or all of the outermost laminate, all of the intermediate laminates, and some of the innermost laminate. This can be done, for example, by using a handheld grinding wheel. In the case where the pipe is one of circular cross-section, this removal can be effected more efficiently and precisely, by mounting the pipe in a lathe and removing the desired laminates or portions thereof with a cutting tool.

Referring again to FIG. 1, as indicated above, pipe assembly 6 also includes flange 8. Flange 8 is disposed around pipe 2 so that flange 8 is distal to flared end region 16. For purposes of the present application, flange 8 is to be considered distal to flared end region 16 if any portion of flange 8 is distal to every portion of flared end region 16 (e.g., at least a portion of flange 8 is disposed around a non-flared portion of pipe 2). FIG. 1. shows a preferred embodiment, where every portion of flange 8 is distal to every portion of flared end region 16.

Figure 2A:
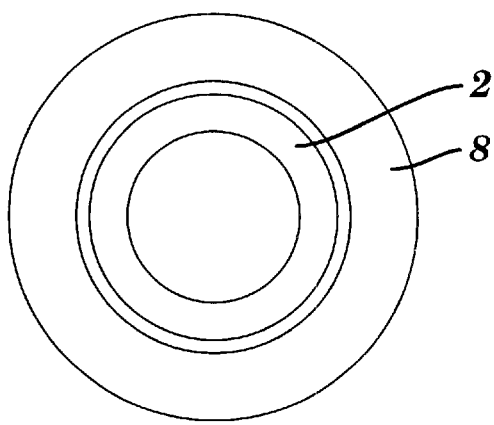
FIGS. 2A, 2B, 2C, and 2D are a radial cross-sectional views of a portion of various pipe assemblies in accordance with the present invention.
Figure 2B:
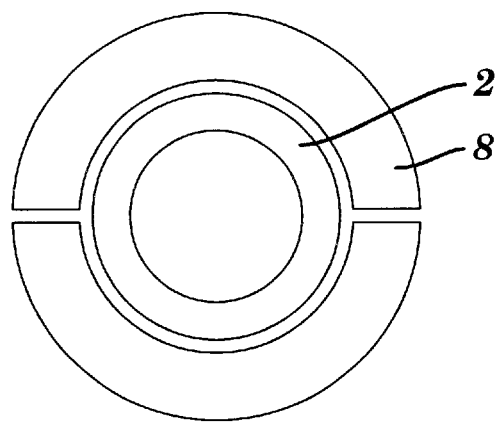
Figure 2C:
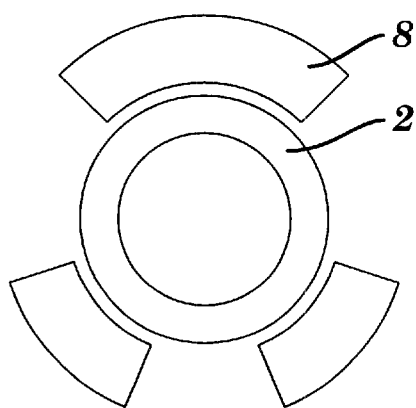
Figure 2D:
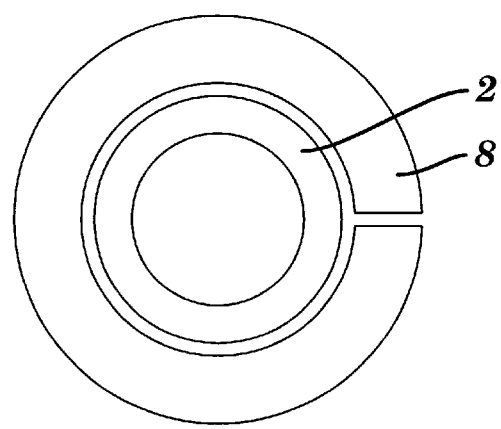

As indicated above, flange 8 is disposed around pipe 2. The meaning of "disposed around" will be more readily understood with reference to FIGS. 2A–2D, which are cross sectional slices taken along line A—A in FIG. 1. As shown in FIG. 2A, flange 8 can have a solid cross section and completely encircle pipe 2, or, as shown in FIG. 2D, flange 8 can have a solid cross section and completely encircle pipe 2 but for a single lengthwise split along the flange. Alternatively, as shown in FIG. 2B, flange 8 can be comprised of, for example, two or more segments (e.g., two halves) which completely or substantially encircle pipe 2. Still alternatively, as shown in FIG. 2C, flange 8 can be comprised of two or more segments which, taken together, only partially encircle pipe 2. In this case, it is preferred that the segments be spaced substantially uniformly around pipe 2's circumference. Preferably, flange 8 completely or substantially encircles pipe 2 and consists of no more than 2 segments.

Flange 8 can be loosely disposed around pipe 2, or it can be disposed and secured around pipe 2. As discussed in greater detail below, flange 8 can be secured to pipe 2 in a number of different ways, for example, mechanically and/or adhesively. "Loosely disposed", as used herein, refers to those situations where flange 8 is not secured to pipe 2. Thus, pipe 2 can be provided where flange 8 is not only disposed around but also secured to pipe 2, or alternately, pipe 2 can be provided where flange 8 is loosely disposed around pipe 2. In the latter case, flange 8 is not secured to pipe 2. Thus, for example, the method of the present invention can be practiced using multi-laminate pipes or lined steel pipes by first forming the flared end region (for example, as discussed in more detail above) and, subsequently, while the innermost laminate (in the case of multi-laminate pipes) or liner (in the case of lined steel pipes) is present within the pipe, securing the flange to the pipe in a separate step.

Figure 3C:
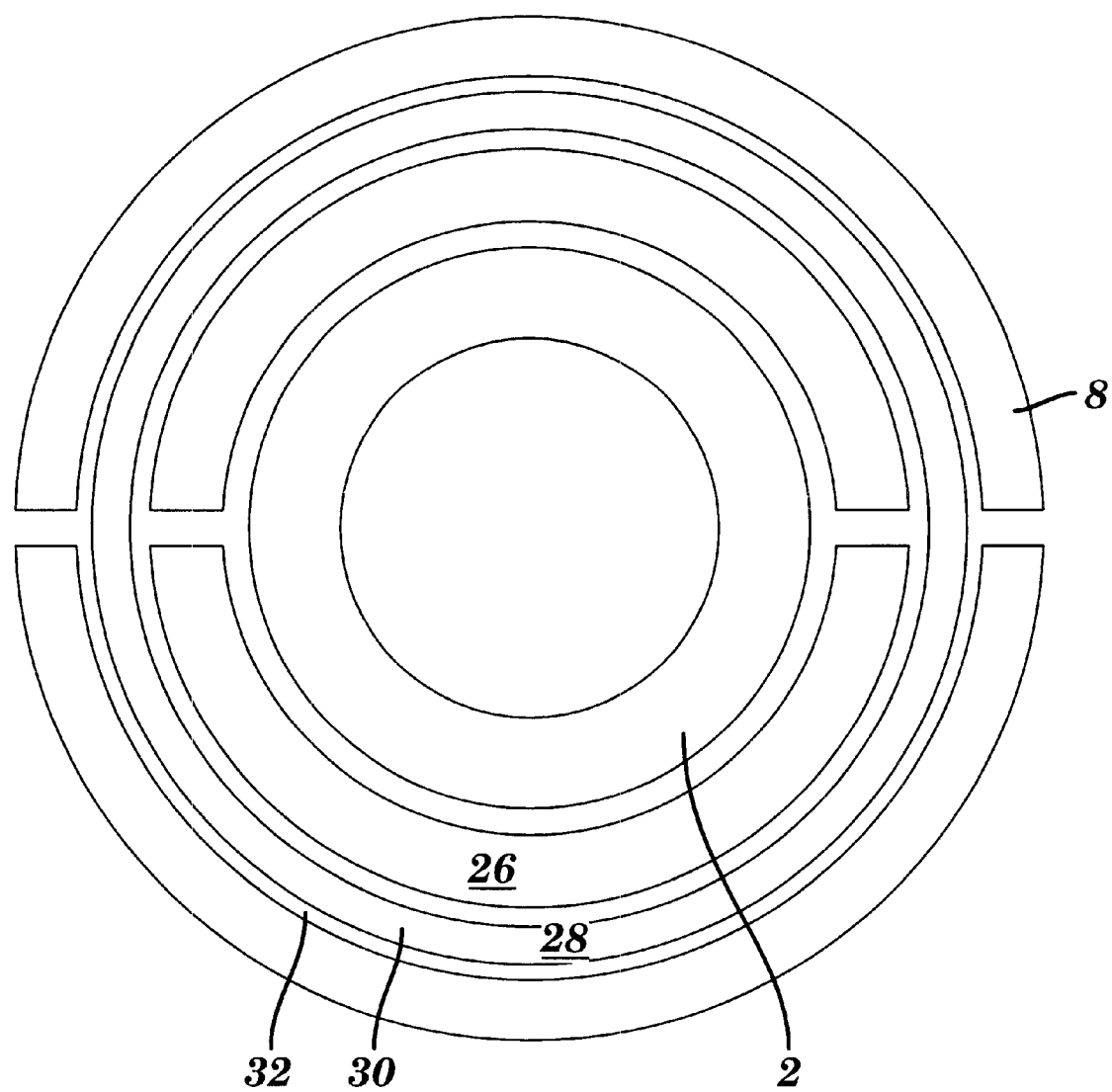
FIG. 3C is a radial cross-sectional view of a portion of a pipe assembly in accordance with the present invention.

Flange 8 also includes a flange sealing surface 26. The shape of flange sealing surface 26 is typically selected based on the shape of external sealing surface 4 and typically corresponds to the shape of pipe 2's flared end region 16. Flange sealing surface 26 can be planar (as shown in FIG. 1), or it can be of any other suitable shape (e.g., concave, convex, etc.) In some situations, especially those where flared end region 16 is particularly thin or deformable, it may be advantageous for flange sealing surface 26 to include one or more annular protruding surfaces 28, as shown in FIGS. 3A–3C. In FIG. 3A, protruding surfaces 28 are formed by protrusions 29 which are integral with the flange 8. In FIG. 3B, protruding surfaces 28 are formed by non-integral annular ring 30 and 31, which can, advantageously, be retained in position by recess 32. As shown in FIG. 3C, in cases where flange 8 is comprised of two or more segments (e.g., two halves) which completely or substantially encircle pipe 2 (as shown, for example n FIG. 2B), it is preferred that flange sealing surface 26 include protruding surfaces 28 which are formed by non-integral annular ring 30, which can, advantageously, be retained in position by recess 32.

The method of the present invention further includes securing flange 8 to pipe 2 so that proximal movement of flange 8 relative to pipe 2 is restricted. Furthermore, the securing is carried out non-integrally, and the securing is carried out distally to flared end region 16. For purposes of the present invention, "securing is carried out distally to flared end region 16" when flange 8 is attached, for example, mechanically, adhesively, or by welding, to pipe 2 at one or more points along pipe 2 that are distal to flared end region 16. For purposes of the present invention, proximal movement of flange 8 relative to pipe 2 is to be considered "restricted" in cases where such proximal movement is completely prevented (as in the case of steel pipe when a flange is welded thereto or where a flange is threaded thereon) and/or in cases where, when a distal force (i.e., a force pulling pipe 2 in a distal direction) is applied to the distal end of pipe 2, at least some (e.g., at least about 10%, at least about 30%, at least about 50%, at least about 70%, at least about 80%, at least about 90%, at least about 95%, and/or at least about 98%) of the resulting tension is transferred to flange 8 at a point distal to pipe 2's flared end region 16. Securing flange 8 to pipe 2, optionally, may also restrict movement of flange 8 relative to pipe 2 in one or more other directions (e.g., distally and/or radially).

The method by which flange 8 is secured to pipe 2 is not particularly critical to the practice of the present invention, and securing can be effected, for example, using any of the conventional methods of securing flanges to pipes. Illustratively, the flange can be adhesively secured to the pipe, for example, by using a suitable adhesive. Selection of adhesive depends, of course, on the nature of the material from which the flange is made, on the nature of the material from which the pipe is made (particularly, that portion of the pipe to which the flange is to be adhered), environmental conditions to which the pipe is likely to be subjected, and the like. Alternatively or additionally, the flange can be mechanically secured to the pipe, for example, using mechanical fasteners, using pipe-threading techniques, or using the preferred methods set forth below.

Flange 8 can be secured to any convenient portion of pipe 2, provided that at least some portion of flange 8 is secured distally to pipe 2's flared end region 16. When using multi-laminate pipes, for maximum strength, flange 8 is preferably secured to the outermost laminate of the multi-laminate pipe, which is typically the strongest and most rigid. Preferably, flange sealing surface 26 is aligned with or near the distal edge flared end region 16 of pipe 2. However, the method of the present invention can be practiced by securing flange 8 to any portion of pipe 2 which provides sufficient structural strength and rigidity to withstand the forces encountered in drawing flange 8 toward the external sealing surface 4 and the forces associated with subsequent application of expected service conditions (e.g., expected temperature, pressure, and/or vacuum conditions).

The method of the present invention also includes drawing flange 8 toward external sealing surface 4 in such a manner that the drawing process causes flange sealing surface 26 to bias pipe 2's flared end region 16 into sealing contact with external sealing surface 4. Flange 8 can be drawn toward external sealing surface 4 by any convenient method. For example, referring again to FIG. 1, flange 8 can be provided with holes 34 which align with corresponding holes 36 in external mounting surface 4, and a nut and bolt combination (not shown) can be used to draw flange 8 toward external sealing surface 4. Alternatively, the aforementioned holes 34 and/or 36 in flange 8 and/or external sealing surface 4 can be replaced with one or more threaded studs (not shown). Still alternatively, flange 8 pipe assembly 6 can also include backup ring 38 having, for example, holes 40. In this arrangement, a bolt/nut combination (not shown) can be used in conjunction with corresponding holes 42 in external sealing surface 4 to draw backup ring 38 toward external sealing surface 4, thereby causing flange 8 to be drawn toward external sealing surface 4, which, in turn causes flange sealing surface 26 to bias pipe 2's flared end region 16 into sealing contact with external sealing surface 4. A backup ring arrangement can also be used to exert a distal force on external sealing surface 4. Rather than using threaded nut/bolt or nut/stud arrangements for exerting the drawing force, clamping mechanisms (e.g., spring loaded clamping mechanisms) can be used (with or without backup rings) to draw flange 8 toward external sealing surface 4. As is standard practice, to produce optimal seals, the force used to draw flange 8 toward external sealing surface 4 should comply with appropriate gasket seating requirements.

As indicated above, the method of the present invention includes the steps of providing, securing, and drawing. Each of the three steps can be performed sequentially. Alternatively, the securing step can be combined with the providing step or with the drawing step.

For example, in some cases, depending on the nature of the mechanism by which flange 8 is secured to pipe 2, securing can be effected as part of the process of drawing flange 8 toward external sealing surface 4.

FIGS. 4A, 4B, 5A, 5B, 6A, 6B, and 6C illustrate preferred embodiments for mechanically securing flange 8 to pipe 2. Although these embodiments are mentioned as preferred embodiments for the above-described method in which flared end region 16 is integral with pipe 2, these embodiments' methods and structures for mechanically securing flanges to pipes can be used generally. For example, these methods and structures can be used for sealing pipes to external sealing surfaces even where flared end region 16 is not integral with pipe 2 (e.g., where a separate flare portion is sealed to the pipe's inner surface). The present invention, in another aspect thereof, relates to such more general methods and structures.

Figure 4B:
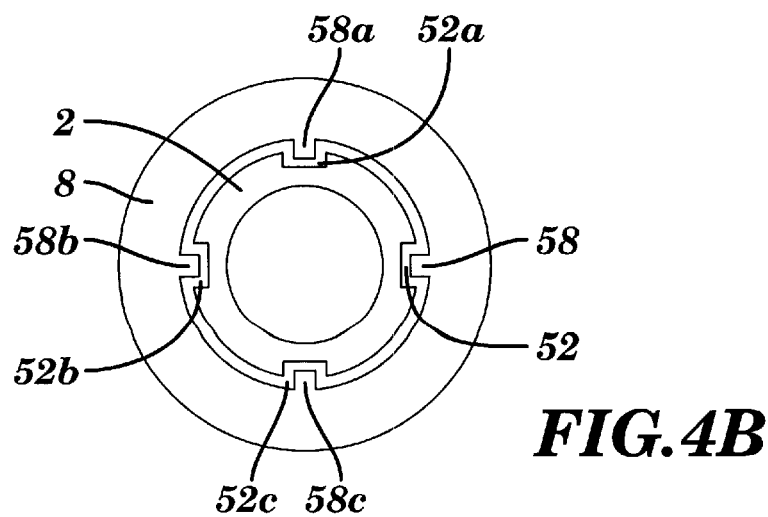
FIG. 4B is an radial cross-sectional view of a portion of a pipe assembly in accordance with the present invention.

FIG. 4A illustrates a preferred embodiment for mechanically securing flange 8 to pipe 2. In this embodiment, pipe assembly 6 includes pipe 2, flange 8, and optional backup ring 38. In FIG. 4A, pipe 2 is illustrated as being a multi-laminate pipe, having innermost laminate 2a and outermost laminate 2b. Pipe 2 has an outer surface 50 which includes recess 52. Flange 8 has an inner surface 56 which includes protrusion 58. Flange 8's protrusion 58 aligns with pipe 2's recess 52. When flange 8 is drawn to external sealing surface 4, flange 8's protrusion 58 (more particularly protrusion 58's proximal edge 60) engages with pipe 2's recess 52 (more particularly recess 52's proximal edge 62) which secures flange 8 to pipe 2 so as to prevent proximal movement of flange 8 relative to pipe 2. Recess 52 is preferably a circumferential groove in pipe 2's outer surface 50, and protrusion 58 is preferably a circumferential ridge on flange 8's inner surface 56. More preferably, recess 52 is preferably a circumferential groove that is perpendicular to pipe axis 10. Alternatively, as shown in FIG. 4B (which is a cross-sectional slice of pipe 2 and flange 8 taken along line B—B in FIG. 4A), pipe 2's outer surface 50 can include a plurality of discrete recesses 52, 52a, 52b, and 52c, preferably with a corresponding number of discrete, aligning protrusions 58, 58a, 58b, and 58c in flange 8's inner surface 56. To facilitate disposing flange 8 about pipe 2, flange 8 can be split, as shown in FIG. 2D, or it can be comprised of two or more segments (e.g., two halves) which completely or substantially encircle pipe 2, as shown in FIG. 2B. Referring again to FIG. 4A, alternatively or additionally, disposing flange 8 about pipe 2 can be further facilitated when inner face 64 of protrusion 58 is beveled such that protrusion 58's projection above flange 8's inner surface 56 is greatest (and, generally, not greater than the depth of corresponding recess 52) at protrusion 58's proximal edge 60 and smallest (and, preferably, zero) at protrusion 58's distal edge 63.

As indicated above, the embodiment of the present invention illustrated in FIG. 4A shows pipe 2 being a multi-laminate pipe, more particularly, a dual-laminate pipe having innermost laminate 2a and outermost laminate 2b. FIG. 4A also illustrates the preferred embodiment where flared end region 16 is thinned and includes only innermost laminate 2a and none of outermost laminate 2b. Further, in the example depicted in FIG. 4A, the depth of recess 52 is shown as being equal to about three-fourths of the thickness of outermost laminate 2b. However, this need not be the case, and the invention, when using multi-laminate pipes, can be practiced with recesses deeper or shallower than the embodiment illustrated.

Figure 5A:
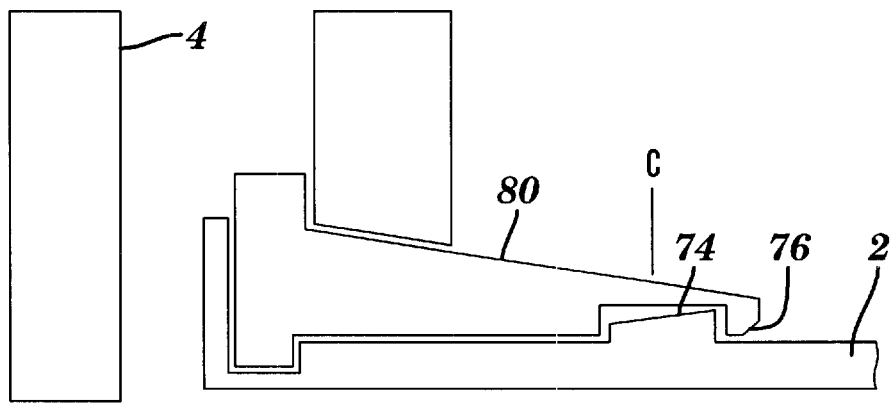
FIG. 5A is an axial cross-sectional view of a pipe assembly in accordance with the present invention.
Figure 5A:
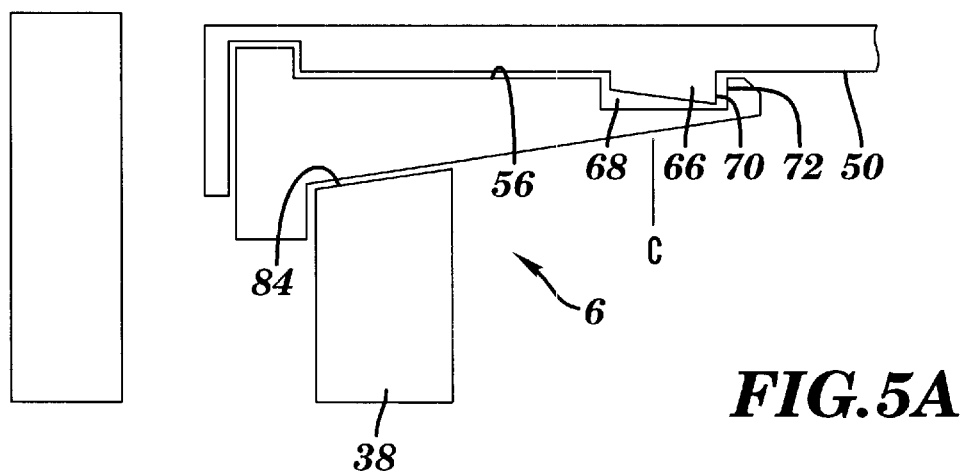
Figure 5B:
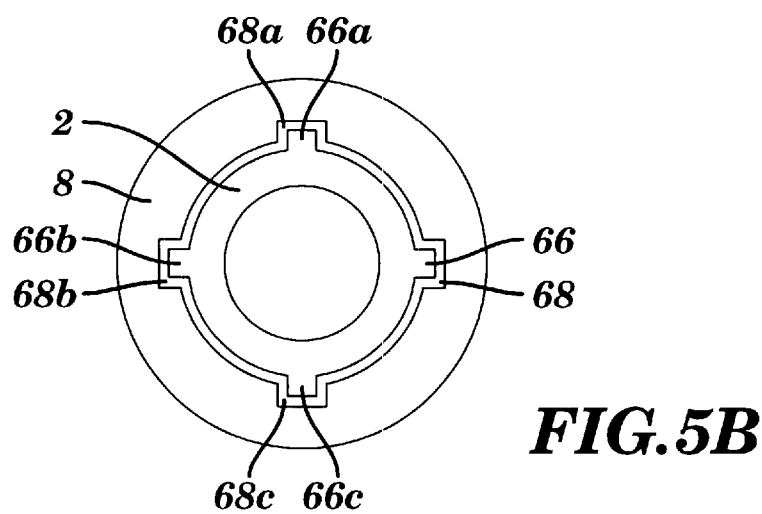
FIG. 5B is an radial cross-sectional view of a portion of a pipe assembly in accordance with the present invention.

FIG. 5A illustrates another preferred embodiment for mechanically securing flange 8 to pipe 2. In this embodiment, pipe assembly 6 includes pipe 2, flange 8, and optional backup ring 38. Pipe 2 has an outer surface 50 which includes protrusion 66. Flange 8 has an inner surface 56 which includes recess 68. Pipe 2's protrusion 66 aligns with flange 8's recess 68. When flange 8 is drawn to external sealing surface 4, pipe 2's protrusion 66 (more particularly protrusion 66's distal edge 70) engages with flange 8's recess 68 (more particularly recess 68's distal edge 72) which secures flange 8 to pipe 2 so as to prevent proximal movement of flange 8 relative to pipe 2. Recess 68 is preferably a circumferential groove in flange 8's inner surface 56, and protrusion 66 is preferably a circumferential ridge on pipe 2's outer surface 50. More preferably, protrusion 66 is a circumferential ridge that is perpendicular to pipe axis 10. Alternatively, as shown in FIG. 5B (which is a cross-sectional slice of pipe 2 and flange 8 taken along line C—C in FIG. 5A), pipe 2's outer surface 50 can include a plurality of discrete protrusions 66, 66a, 66b, and 66c, preferably with a corresponding number of discrete, aligning recesses 68, 68a, 68b, and 68c in flange 8's inner surface 56. To facilitate disposing flange 8 about pipe 2, flange 8 can be split, as shown in FIG. 2D, or it can be comprised of two or more segments (e.g., two halves) which completely or substantially encircle pipe 2, as shown in FIG. 2B. Referring again to FIG. 5A, alternatively or additionally, disposing flange 8 about pipe 2 can be further facilitated when outer face 74 of protrusion 66 is beveled such that protrusion 66's projection above pipe 2's outer surface 50 is greatest (and, generally, not greater than the depth of corresponding recess 68) at protrusion 66's distal edge 70 and smallest (and, preferably, zero) at protrusion 66's proximal edge 73. Disposing flange 8 about pipe 2 can be still further facilitated by, additionally or alternatively, beveling distal edge 76 of flange 8, as further shown in FIG. 5A.

FIGS. 6A, 6B, and 6C illustrate yet another preferred embodiment for securing flange 8 to pipe 2. Referring to the embodiment described in FIG. 6A, pipe assembly 6 includes pipe 2, flange 8, and backup ring 38. Pipe 2 has an outer surface 50, and flange 8 has a inner surface 56 and an outer surface 80. At least a portion of flange 8's outer surface 80 is tapered such that flange 8's maximum wall thickness 82 (also see FIG. 6B) decreases distally. Preferably, flange 8's outer surface 80 is tapered linearly(as shown in FIG. 6A). Where pipe 2 has a circular cross-section, flange 8 preferably has a circular cross section with distally decreasing diameter, although, as one skilled in the art will recognize, other tapered cross sections (such as the ones shown in FIGS. 6B and 6C) are suitable. Backup ring 38 includes inside flange mating surface 84, which is preferably tapered, preferably to the same degree as is flange 8's outer surface 80. In practice, as backup ring 38 is urged toward external sealing surface 4 (i.e., proximally), backup ring 38's inside flange mating surface 84 contacts flange 8's tapered outer surface 80, thereby biasing flange 8's inner surface 56 against pipe 2's outer surface 50. As used in this context, "biasing . . . against" is meant to include those cases where flange 8's inner surface 56 is directly in contact with and is directly forced against pipe 2's outer surface 50 as well as those situations where some intervening material is present such that flange 8's inner surface 56 is contacts and is forced against the intervening material, which, in turn, is forced against pipe 2's outer surface 50. Where flange 8 is adhesively secured to pipe 2, the resulting biasing of flange 8's inner surface 56 against pipe 2's outer surface 50 increases the degree to which flange 8 is secured to pipe 2. Where flange 8 is mechanically secured to pipe 2, the resulting biasing of flange 8's inner surface 56 against pipe 2's outer surface 50 can cause flange 8 to become secured to pipe 2, or the resulting biasing of flange 8's inner surface 56 against pipe 2's outer surface 50 can increase the degree to which flange 8 is mechanically secured to pipe 2. As one skilled in the art will recognize, optimal performance with this combination of tapered flange 8 and backup ring 38 will be achieved when the cross-sectional outside diameter of tapered flange 8 at the point where backup ring 38 contacts and biases flange 8 toward external sealing surface 4 is balanced with the inside diameter of backup ring 38 so as to provide the desired balance of lateral force (i.e., force directed proximally, for example, to meet gasket seating requirements) and axial force (i.e., force biasing flange 8's inner surface 56 against pipe 2's outer surface 50, for example, to secure flange 8 to pipe 2 or increase the degree to which flange 8 is secured to pipe 2). Although the methods and structures set forth in this embodiment are generally useful, they are particularly useful in situations where flange 8 is comprised of two or more segments (e.g., two halves) which completely or substantially encircle pipe 2, as illustrated in FIG. 2B. Furthermore, the methods and structures set forth in this embodiment are particularly useful in conjunction with the mechanical securing methods set forth in the discussion above relating to FIGS. 4A, 4B, 5A, and 5B. Accordingly, although not necessary for the practice of those embodiments, FIGS. 4A and 5A illustrate flange 8 as having a tapered outer surface 80 and backup ring 38 having a tapered inside flange mating surface 84.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method for sealing an end of a pipe to an external sealing surface, said method comprising:

providing a pipe assembly comprising a pipe and a flange, wherein the pipe comprises a proximal pipe end and a flared end region; wherein the flared end region is proximate to and continuous with the proximal pipe end; and wherein the flange is non-integrally and loosely disposed around the pipe distal to the pipe's flared end region;

securing, non-integrally and distally to the pipe's flared end region, the flange to the pipe so that proximal movement of the flange relative to the pipe is restricted; and drawing the flange toward the external sealing surface, wherein said drawing causes the flange sealing surface to bias the pipe's flared end region into sealing contact with the external sealing surface, wherein the pipe is a multi-laminate pipe comprising an innermost laminate and an outermost laminate and wherein the flared end region is integral with the innermost laminate of the pipe and comprises substantially no outermost laminate.

2. A method according to claim 1, wherein said securing is carried out mechanically.

3. A method according to claim 1, wherein said drawing effects said securing.

4. A method according to claim 3, wherein the flange comprises two parts which together substantially encircle the pipe.

5. A method according to claim 1, wherein the flange sealing surface comprises an annular recess and wherein the flange further comprises an annular ring partially recessed in the flange sealing surface's annular recess.

6. A method for sealing an end of a pipe to an external sealing surface, said method comprising:

providing a pipe assembly comprising a pipe and a flange, wherein the pipe comprises a proximal pipe end and a flared end region; wherein the flared end region is proximate to and continuous with the proximal pipe end; and wherein the flange is non-integrally and loosely disposed around the pipe distal to the pipe's flared end region;

securing, non-integrally and distally to the pipe's flared end region, the flange to the pipe so that proximal movement of the flange relative to the pipe is restricted; and drawing the flange toward the external sealing surface, wherein said drawing causes the flange sealing surface to bias the pipe's flared end region into sealing contact with the external sealing surface; wherein the flared end region is integral with the pipe; wherein the pipe has an outer surface; wherein the flange has an inner surface; wherein the pipe joint assembly further comprises a backer ring; wherein said drawing comprises urging the backer ring toward the external sealing surface; and wherein said urging biases the inner surface of the flange against the outer surface of the pipe.

7. A method according to claim 6, wherein said urging biases the inner surface of the flange against the outer surface of the pipe to a degree sufficient to mechanically secure the flange to the pipe so that proximal movement of the flange relative to the pipe is restricted.

8. A method according to claim 6, wherein the flange comprises a recess on the inner surface thereof; wherein the pipe comprises a protrusion on the outer surface thereof, which protrusion aligns with the flange's recess; and wherein said urging causes the flange's recess to engage with the pipe's protrusion, thereby mechanically securing the flange to the pipe so that proximal movement of the flange relative to the pipe is restricted.

9. A method according to claim 8, wherein the flange's recess is a circumferential groove and wherein the pipe's protrusion is a circumferential ridge.

10. A method according to claim 6, wherein the flange comprises a protrusion on the inner surface thereof; wherein the pipe comprises a recess on the outer surface thereof, which recess aligns with the flange's protrusion; and wherein said urging causes the flange's protrusion to engage with the pipe's recess, thereby mechanically securing the flange to the pipe so that proximal movement of the flange relative to the pipe is restricted.

11. A method according to claim 10, wherein the pipe's recess is a circumferential groove and wherein the flange's protrusion is a circumferential ridge.

12. A method according to claim 6, wherein the flange has a tapered outer surface; wherein the backer ring has an inside flange mating surface; and wherein said urging causes the backer ring's inside flange mating surface to contact the flange's tapered outer surface and to bias the flange's inner surface against the pipe's outer surface.

13. A method according to claim 12, wherein the backer ring's inside flange mating surface is tapered.

14. A method according to claim 6, wherein the flange comprises two parts which together substantially encircle the pipe.

15. A method according to claim 6, wherein the flange sealing surface comprises an annular recess and wherein the flange further comprises an annular ring partially recessed in the flange sealing surface's annular recess.

16. A method for sealing an end of a pipe to an external sealing surface, said method comprising:

providing a pipe assembly comprising a pipe and a flange, wherein the pipe comprises a proximal pipe end and a flared end region; wherein the flared end region is proximate to and continuous with the proximal pipe end; and wherein the flange is non-integrally and loosely disposed around the pipe distal to the pipe's flared end region;

securing, non-integrally and distally to the pipe's flared end region, the flange to the pipe so that proximal movement of the flange relative to the pipe is restricted; and drawing the flange toward the external sealing surface, wherein said drawing causes the flange sealing surface to bias the pipe's flared end region into sealing contact with the external sealing surface; wherein the flared end region is integral with the pipe; wherein the flange comprises two parts which together substantially encircle the pipe; wherein the flange sealing surface comprises an annular recess; and wherein the flange further comprises an annular ring partially recessed in the flange sealing surface's annular recess.

17. A method for sealing an end of a pipe to an external sealing surface, said method comprising:

providing a pipe assembly comprising a pipe and a flange, wherein the pipe is a multi-laminate pipe; wherein the pipe comprises a proximal pipe end and a flared end region; wherein the flared end region is proximate to and continuous with the proximal pipe end; wherein the flange is non-integrally disposed around the pipe distal to the pipe's flared end region; and wherein the flange is secured, non-integrally and distally to the pipe's flared end region, to the pipe so that proximal movement of the flange relative to the pipe is restricted; and drawing the flange toward the external sealing surface, wherein said drawing causes the flange sealing surface to bias the pipe's flared end region into sealing contact with the external sealing surface; wherein the pipe has an outer surface; wherein the flange has an inner surface; wherein the pipe joint assembly further comprises a backer ring; wherein said drawing comprises urging the backer ring toward the external sealing surface; and wherein said urging biases the inner surface of the flange against the outer surface of the pipe.

18. A method according to claim 17, wherein the flange has a tapered outer surface; wherein the backer ring has an inside flange mating surface; and wherein said urging causes the backer ring's inside flange mating surface to contact the flange's tapered outer surface and to bias the flange's inner surface against the pipe's outer surface.

19. A method according to claim 18, wherein the backer ring's inside flange mating surface is tapered.

20. A method according to claim 17, wherein the flange comprises two parts which together substantially encircle the pipe.

21. A method according to claim 20, wherein the flange sealing surface comprises an annular recess and wherein the flange further comprises an annular ring partially recessed in the flange sealing surface's annular recess.

22. A method for sealing an end of a pipe to an external sealing surface, said method comprising:

providing a pipe assembly comprising a pipe and a flange, wherein the pipe is a multi-laminate pipe; wherein the pipe comprises a proximal pipe end and a flared end region; wherein the flared end region is proximate to and continuous with the proximal pipe end; wherein the flange is non-integrally disposed around the pipe distal to the pipe's flared end region; and wherein the flange is secured, non-integrally and distally to the pipe's flared end region, to the pipe so that proximal movement of the flange relative to the pipe is restricted; and drawing the flange toward the external sealing surface, wherein said drawing causes the flange sealing surface to bias the pipe's flared end region into sealing contact with the external sealing surface; wherein the flange comprises two parts which together substantially encircle the pipe; wherein the flange sealing surface comprises an annular recess; and wherein the flange further comprises an annular ring partially recessed in the flange sealing surface's annular recess.

23. A pipe assembly comprising:

a multi-laminate pipe and a flange, wherein said pipe comprises a proximal pipe end and a flared end region; wherein the flared end region is proximate to and continuous with the proximal pipe end; wherein said flange is secured, non-integrally and distally to said pipe's flared end region, to said pipe so that proximal movement of said flange relative to said pipe is restricted; wherein said pipe has an outer surface; wherein said flange has an inner surface; and wherein said pipe assembly further comprises a backer ring which, when urged proximally relative to said pipe, biases the inner surface of said flange against the outer surface of said pipe.

24. A pipe assembly according to claim 23, wherein said flange comprises a recess on the inner surface thereof; wherein said pipe comprises a protrusion on the outer surface thereof, which protrusion aligns with said flange's recess.

25. A pipe assembly according to claim 24, wherein said flange's recess is a circumferential groove and wherein said pipe's protrusion is a circumferential ridge.

26. A pipe assembly according to claim 23, wherein said flange comprises a protrusion on the inner surface thereof; wherein said pipe comprises a recess on the outer surface thereof, which recess aligns with said flange's protrusion.

27. A pipe assembly according to claim 26, wherein said pipe's recess is a circumferential groove and wherein said flange's protrusion is a circumferential ridge.

28. A pipe assembly according to claims 23, wherein said flange has a tapered outer surface and wherein said backer ring has an inside flange mating surface.

29. A pipe assembly according claim 28, wherein said backer ring's inside flange mating surface is tapered.

30. A pipe assembly according to claim 23, wherein said flange comprises two parts which together substantially encircle the pipe.

31. A pipe assembly according to claim 30 wherein the flange sealing surface comprises an annular recess and wherein said flange further comprises an annular ring partially recessed in the flange sealing surface's annular recess.

32. A pipe assembly comprising:

a multi-laminate pipe and a flange, wherein said pipe comprises a proximal pipe end and a flared end region; wherein the flared end region is proximate to and continuous with the proximal pipe end; wherein said flange is secured, non-integrally and distally to said pipe's flared end region, to said pipe so that proximal movement of said flange relative to said pipe is restricted; wherein said flange comprises two parts which together substantially encircle the pipe; wherein the flange sealing surface comprises an annular recess; and wherein said flange further comprises an annular ring partially recessed in the flange sealing surface's annular recess.

33. A joint assembly comprising:

a flange having an outer surface, an inner surface, and a proximal flange sealing surface end having an annular recess therein, wherein the inner surface comprises a circumferential groove or a circumferential ridge; wherein said outer surface comprises a taper; and a backer ring having a tapered inside flange mating surface, wherein, when said backer ring is disposed around said flange's outer surface and urged proximally relative to said flange, said backer ring biases the inner surface of said flange inwardly.

34. A method for sealing an end of a pipe to an external sealing surface, said method comprising:

providing a pipe assembly comprising a pipe, a flange, and a backer ring, wherein the pipe comprises a proximal pipe end, an outer surface, and a flared end region; wherein the flared end region is proximate to and continuous with the proximal pipe end; wherein the flange comprises an inner surface; and wherein the flange is non-integrally disposed around the pipe distal to the pipe's flared end region;

securing, non-integrally and distally to the pipe's flared end region, the flange to the pipe so that proximal movement of the flange relative to the pipe is restricted; and drawing the flange toward the external sealing surface by urging the backer ring toward the external sealing surface, wherein said drawing causes the flange sealing surface to bias the pipe's flared end region into sealing contact with the external sealing surface and wherein said urging biases the inner surface of the flange against the outer surface of the pipe.

35. A method according to claim 34, wherein the pipe is a multi-laminate pipe comprising an innermost laminate and an outermost laminate and wherein the flared end region is integral with the innermost laminate of the pipe and comprises substantially no outermost laminate.

36. A method according to claim 34, wherein the flange has a tapered outer surface; wherein the backer ring has a tapered inside flange mating surface; and wherein said urging causes the backer ring's tapered inside flange mating surface to contact the flange's tapered outer surface and to bias the flange's inner surface against the pipe's outer surface.

37. A method for sealing an end of a pipe to an external sealing surface, said method comprising:

providing a pipe assembly comprising a pipe, a flange, and a backer ring, wherein the pipe comprises a proximal pipe end, an outer surface, and a flared end region; wherein the flared end region is proximate to and continuous with the proximal pipe end; wherein the flange comprises an inner surface; wherein the flange is non-integrally disposed around the pipe distal to the piper's flared end region; and wherein the flange is secured, non-integrally and distally to the pipe's flared end region, to the pipe so that proximal movement of the flange relative to the pipe is restricted; and drawing the flange toward the external sealing surface by urging the backer ring toward the external sealing surface, wherein said drawing causes the flange sealing surface to bias the pipe's flared end region into sealing contact with the external sealing surface and wherein said urging biases the inner surface of the flange against the outer surface of the pipe.

38. A method according to claim 37, wherein the pipe is a multi-laminate pipe comprising an innermost laminate and an outermost laminate and wherein the flared end region is integral with the innermost laminate of the pipe and comprises substantially no outermost laminate.

39. A method according to claim 37, wherein the flange has a tapered outer surface; wherein the backer ring has a tapered inside flange mating surface; and wherein said urging causes the backer ring's tapered inside flange mating surface to contact the flange's tapered outer surface and to bias the flange's inner surface against the pipe's outer surface.

40. A pipe assembly comprising:
   a pipe, wherein said pipe comprises a proximal pipe end, an outer surface, and a flared end region; and wherein the flared end region is proximate to and continuous with the proximal pipe end;
   a flange, wherein said flange has an inner surface; and wherein said flange is non-integrally disposed around said pipe distal to said pipe's flared end region; and
   a backer ring, which, when urged proximally relative to said pipe, biases the inner surface of said flange against the outer surface of said pipe, wherein said pipe is a multi-laminate pipe comprising an innermost laminate and an outermost laminate and wherein the flared end region is integral with the innermost laminate of said pipe and comprises substantially no outermost laminate.

41. A pipe assembly comprising:
   a pipe, wherein said pipe comprises a proximal pipe end, an outer surface, and a flared end region; and wherein the flared end region is proximate to and continuous with the proximal pipe end;
   a flange, wherein said flange has an inner surface; and wherein said flange is non-integrally disposed around said pipe distal to said pipe's flared end region; and
   a backer ring, which, when urged proximally relative to said pipe, biases the inner surface of said flange against the outer surface of said pipe, wherein said flange has a tapered outer surface and wherein said backer ring has a tapered inside flange mating surface.

42. A pipe assembly according to claim 30, wherein the flared end region is integral with the pipe.

* * * * *